United States Patent
Stretch (10) Patent No.: US 6,619,453 B2
(45) Date of Patent: Sep. 16, 2003

(54) ELECTROMAGNETIC MECHANICAL PARTICLE CLUTCH

(75) Inventor: Dale A. Stretch, Novi, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/020,272

(22) Filed: Dec. 14, 2001

(65) Prior Publication Data

US 2003/0111312 A1 Jun. 19, 2003

(51) Int. Cl.⁷ .................. F16D 29/00; F16D 37/02
(52) U.S. Cl. .................. 192/21.5; 192/52.4; 192/84.31
(58) Field of Search .................. 192/21.5, 52.1, 192/52.4, 57, 84.1, 84.2, 84.21, 84.9, 84.96, 84.961, 84.31

(56) References Cited

U.S. PATENT DOCUMENTS

| | | | | |
|---|---|---|---|---|
| 1,823,334 A | * | 9/1931 | Payne | 192/52.4 |
| 2,519,449 A | | 8/1950 | Findley et al. | |
| 2,573,065 A | | 10/1951 | Salemme | |
| 2,575,360 A | | 11/1951 | Rabinow | |
| 2,601,076 A | | 6/1952 | Winther et al. | |
| 2,604,964 A | | 7/1952 | Winther et al. | |
| 2,615,945 A | | 10/1952 | Jaeschke | |
| 2,622,713 A | | 12/1952 | Rabinow | |
| 2,625,037 A | | 1/1953 | Winther | |
| 2,629,471 A | | 2/1953 | Rabinow | |
| 2,631,705 A | | 3/1953 | Winther | |
| 2,685,947 A | | 8/1954 | Votrian | |
| 2,693,261 A | * | 11/1954 | Winther | 192/21.5 |
| 2,718,946 A | | 9/1955 | Winther | |
| 2,725,133 A | | 11/1955 | Winther | |
| 2,738,044 A | * | 3/1956 | Winther | 192/21.5 |
| 2,738,449 A | * | 3/1956 | Mason | 192/84.31 |
| 2,772,762 A | * | 12/1956 | Gamundi et al. | 192/21.5 |
| 2,818,148 A | | 12/1957 | Winther | |
| 2,822,070 A | | 2/1958 | Jaeschke | |
| 2,832,449 A | | 4/1958 | Winther | |
| 2,878,913 A | | 3/1959 | Jaeschke | |
| 2,885,044 A | | 5/1959 | Jaeschke | |
| 2,905,293 A | | 9/1959 | Winther | |
| 2,925,896 A | | 2/1960 | Jaeschke | |
| 2,921,657 A | | 6/1960 | Winther | |
| 3,055,470 A | * | 9/1962 | Pierce | 192/21.5 |
| 3,088,565 A | | 5/1963 | Jaeschke | |
| 3,208,567 A | | 9/1965 | Metzger | |
| 3,216,542 A | | 11/1965 | Comstock | |
| 3,236,784 A | * | 2/1966 | Pierce | 522/32 |
| 3,358,798 A | | 12/1967 | Janson | |
| 3,394,784 A | | 7/1968 | Searle | |
| 3,450,238 A | | 6/1969 | Adkins | |
| 3,620,335 A | | 11/1971 | Hendershot | |
| 3,672,476 A | | 6/1972 | Hendershot | |
| 3,899,061 A | * | 8/1975 | Krug | 192/84.31 |
| 4,509,091 A | * | 4/1985 | Booth | 192/52.4 |

(List continued on next page.)

Primary Examiner—Rodney H. Bonck
(74) Attorney, Agent, or Firm—Rader, Fishman & Grauer PLLC (57) ABSTRACT

A torque transfer device is provided that includes an input member for receiving torque from an external source. An output member is disposed radially inward of the input member to define a first torque transferring region therebetween. A second torque transferring region is also disposed between the input member and output member. A source of magnetic flux is operable to provide a first level of magnetic flux that transfers torque between the input and output members by activation of the first torque transferring region. The source of magnetic flux is also operable to provide a second level of magnetic flux that transfers torque between the input and output members by activation of both the first torque transferring region and the second torque transferring region. The torque transfer device substantially eliminates the "hard" or sudden engagement of conventional electromagnetic clutches.

32 Claims, 5 Drawing Sheets

U.S. PATENT DOCUMENTS

| | | |
|---|---|---|
| 4,624,354 A | 11/1986 | Koitabashi |
| 4,649,458 A * | 3/1987 | Arai et al. ................. 192/84.1 |
| 4,682,676 A | 7/1987 | Murata |
| 4,967,887 A | 11/1990 | Annacchino et al. ...... 192/21.5 |
| 5,713,444 A | 2/1998 | Schroeder |
| 5,803,219 A | 9/1998 | Ogawa |
| 5,847,478 A | 12/1998 | Usui et al. ..................... 310/76 |
| 5,934,429 A | 8/1999 | Jennings ................... 192/70.25 |
| 5,967,273 A | 10/1999 | Hampton ................... 192/21.5 |
| 6,032,772 A | 3/2000 | Moser et al. |
| 6,290,043 B1 | 9/2001 | Ginder et al. .............. 192/21.5 |

\* cited by examiner

ELECTROMAGNETIC MECHANICAL PARTICLE CLUTCH

BACKGROUND OF THE INVENTION

1. Field of the Invention

The present invention relates generally to a torque transfer device and, more particularly, to a torque transfer device employing a particle clutch and an electromagnetic clutch.

2. Description of the Related Art

Magnetically operated devices for transferring torque are well known in the art. One known magnetically operated device for transferring torque is an electromagnetic friction clutch. Electromagnetic friction clutches are commonly used in the automotive field for engaging and disengaging belt-driven engine accessories, such as an air conditioning compressor. An electromagnetic friction clutch is typically provided between the belt and the driven accessory to selectively transfer torque from the drive belt to an input shaft of the accessory.

Electromagnetic friction clutches are engaged by energizing a coil to create a magnet field. In one known electromagnetic friction clutch, the magnetic field forces a spring-biased friction plate of an input member to impact and frictionally engage an output member. Because electromagnetic friction clutches operate in an "ON-OFF" manner, the initial impact of the friction plate against the output member creates an annoying sound that can be heard by occupants of the vehicle. Furthermore, the initial impact of the friction plate against the output member demands a significant amount of torque from the engine, which may be undesirably perceived by the occupants of the vehicle.

Another magnetically operated torque transferring device that is well known in the art is a magnetic particle clutch. A magnetic particle clutch offers advantages such as low vibration torque transfer, the ability to operate in a slip condition and controlled torque transfer. Unlike an electromagnetic friction clutch, a magnetic particle clutch can be gradually engaged to provide a highly controllable, "soft" and substantially noise-free engagement. However, the torque transfer density of a magnetic particle clutch is generally smaller than an electromagnetic friction clutch. In other words, a magnetic particle clutch will transfer less torque per unit area than an electromagnetic friction clutch.

Therefore, it would be desirable to provide a magnetically operated torque transferring device that combines the control and "soft" engagement capabilities of a magnetic particle clutch with the relatively high torque transfer density of an electromagnetic friction clutch.

SUMMARY OF THE INVENTION

In accordance with the principles of the present invention, a torque transfer device is provided that includes an input member for receiving torque from an external source. An output member is disposed radially inward of the input member to define a first torque transferring region therebetween. A second torque transferring region is also disposed between the input member and output member. A source of magnetic flux is operable to provide a first level of magnetic flux that transfers torque between the input and output members by activation of the first torque transferring region. The source of magnetic flux is also operable to provide a second level of magnetic flux that transfers torque between the input and output members by activation of both the first torque transferring region and the second torque transferring region.

In a preferred embodiment of the present invention a torque transfer device is provided that includes a particle clutch having an input drum, an output drum and a magnetically reactive medium. The input drum receives torque from an external source. The input drum has a cylindrical portion extending from a base portion and also has regions of high magnetic permeability and low magnetic permeability. The output drum has a cylindrical portion extending from a base portion and is disposed within the input drum to define a first gap along the cylindrical portions of the input drum and output drum that contains the magnetically reactive medium. The output drum has regions of high magnetic permeability and regions of low magnetic permeability.

The torque transferring device further includes a friction clutch having a friction plate disposed adjacent to one of the base portion of the output drum and the base portion of the input drum to define a second gap therebetween. At least one biasing member is coupled to the friction plate and to the other of the base portion of the input member and the base portion of the output member for maintaining the second gap when the friction plate is disengaged. The torque transfer device also includes a source of magnetic flux that is operable to transition the torque transferring device among a non-engaged state where neither the particle clutch nor the friction clutch are engaged, a partially engaged state where the particle clutch is at least partially engaged, and a fully engaged state where the particle clutch and friction clutch are engaged.

Among other advantages, the torque transfer device substantially eliminates or reduces the "hard" or sudden engagement of conventional electromagnetic clutches. Another advantage is that the torque transfer device substantially eliminates or reduces the undesirable engagement sound that is characteristic of conventional electromagnetic clutches. Still another advantage is that the torque transfer device allows for a gradual, controlled engagement without sacrificing the ability to transfer relatively high levels of torque.

Various additional aspects and advantages of this invention will become apparent to those skilled in the art from the following detailed description of the preferred embodiment, when read in light of the accompanying drawings.

DESCRIPTION OF THE PREFERRED EMBODIMENT

Figure 1:
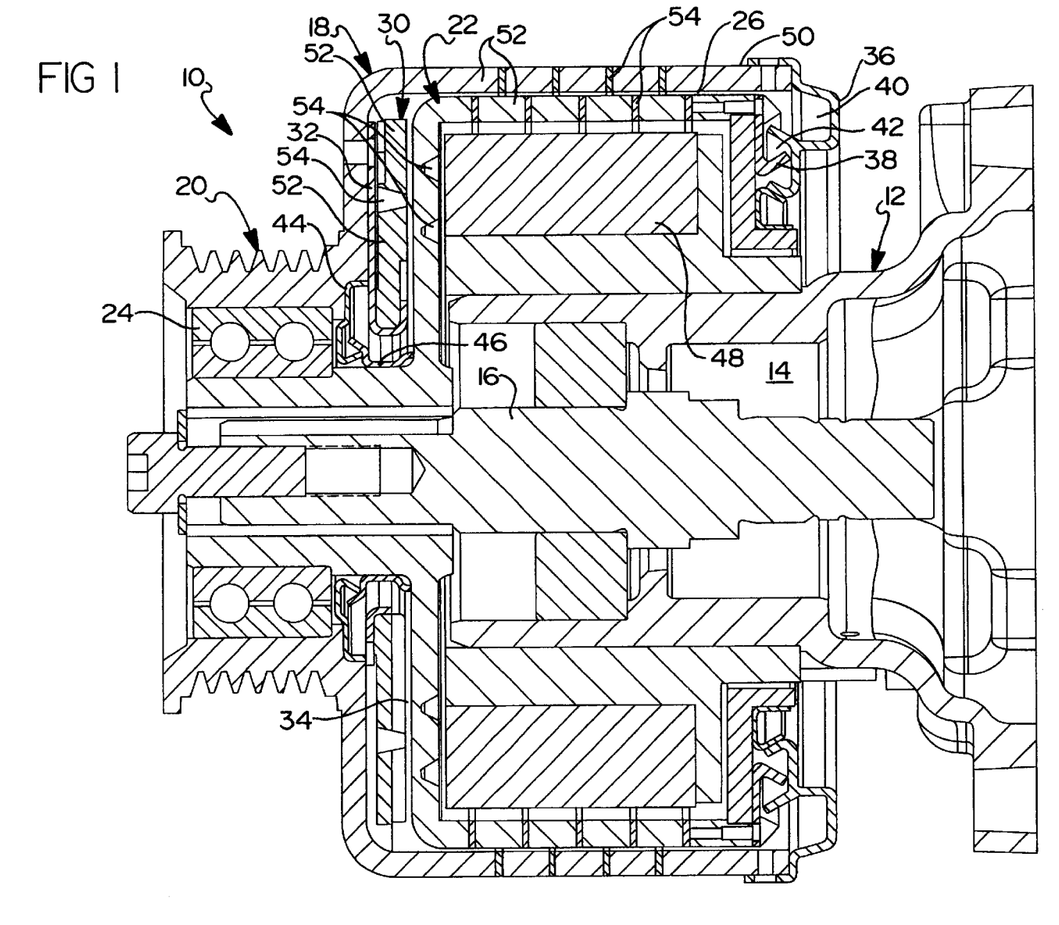
FIG. 1 is a cross sectional view of a torque transfer device according to a preferred embodiment of the present invention.

Referring now to the drawings, various embodiments of the present invention are described in detail. Referring to FIG. 1, a torque transfer device 10 is provided that includes a stationary housing 12 having a duct 14 therethrough for receiving a rotatable shaft 16. Device 10 includes an input member 18 having a pulley 20 for connecting input member 18 to an engine drive belt (not illustrated). While the present invention describes device 10 as being driven by a belt, it will be appreciated that other suitable mechanisms may be employed to drive device 10, such as a gear arrangement or the like.

An output member 22 is disposed radially inward of input member 18 such that input member 18 is rotatable relative to output member 22 when device 10 is disengaged. As illustrated in FIG. 1, input member 18 is rotatably supported on output member 22 by a bearing 24. During operation of device 10, torque that is transferred from input member 18 to output member 22 is provided to shaft 16, which is rotatably supported within housing 12. Shaft 16 may be coupled to output member 22 by any suitable means known in the art including, but not limited to, spines, keys, threaded fasteners and welding.

Figure 2:
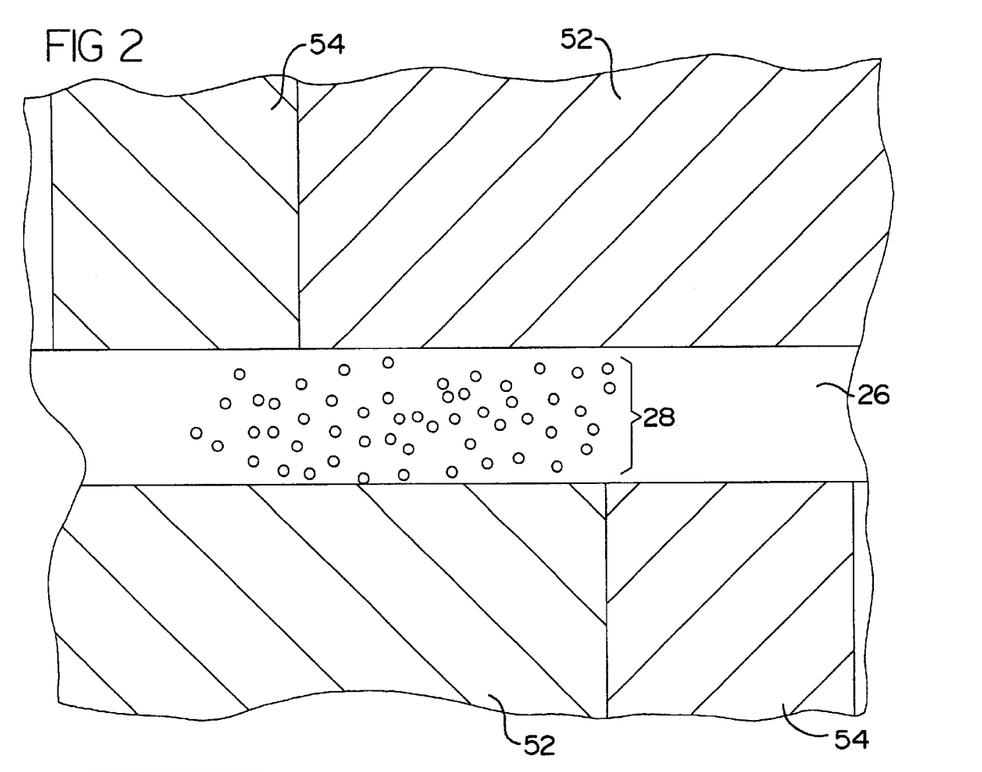
FIG. 2 is an enlarged cross-sectional view of a first gap according to the embodiment of FIG. 1 prior to application of magnetic flux.

Input member 18 and output member 22 are not in contact, but define therebetween a first gap 26 that is generally toroidal in configuration. First gap 26 is of a predetermined width to permit a thin layer of magnetically reactive medium 28 (shown in FIG. 2), such as a magnetically reactive powder or magnetorheological fluid, to reside therein. A magnetically reactive powder is the preferred magnetically reactive medium because it has the advantage of being resistant to temperatures that would degrade oil based magnetorheological fluids.

An armature or friction plate 30 is at least partially disposed between input member 18 and output member 22. In a preferred embodiment, friction plate 30 is extendably coupled to input member 18 by a resilient biasing member 32, such as a leaf spring or the like, such that a second gap 34 is formed between friction plate 30 and output member 22. Alternatively, friction plate 30 may be extendably coupled to output member 22 instead of input member 18 such that second gap 34 is formed between friction plate 30 and input member 18.

Device 10 further includes a pair of non-contacting sealing members 36 and 38 that cooperate to impede the escape of magnetically reactive medium 28 from first gap 26. Sealing members 36 and 38 include cavities 40 and 42 respectively. During application of a magnetic field, centrifugal forces pull magnetically reactive medium 28 from cavities 40 and 42 to the outer surface of cavity 40, whereby the magnetic field pulls medium 28 into first gap 26. When no magnetic field is applied to device 10, magnetically reactive medium 28 is allowed to disseminate into cavities 40 and 42, but is substantially prevented from exiting cavity 42 due to the labyrinth geometry of the interacting sealing members 36 and 38.

A pair of non-contacting annular sealing members 44 and 46 are also fixedly attached to input member 18 and output member 22, respectively, proximate friction plate 30. Sealing members 44 and 46 cooperate to impede the escape of magnetically reactive medium 28 in substantially the same manner as sealing members 36 and 38. The above-described non-contacting "labyrinth" seals are effective to retain a magnetically reactive powder within device 10, but are generally ineffective to retain a magnetorheological fluid within device 10. Therefore, when a magnetorheological fluid is employed in device 10, contact-type seals (not illustrated) such as rubber o-rings are required at the ends of first gap 26.

Torque transfer device 10 further includes a of source a magnetic flux 48. In one embodiment of the present invention, the source of magnetic flux 48 includes a stationary toroidal electromagnet that is supported on the outside of housing 12 between output member 22 and housing 12. Alternatively, the source of magnetic flux 48 may include a permanent magnet supplemented by a counteracting electromagnet so that device 10 will default to being engaged should the electromagnet fail. Also in the alternative, at least a portion of the source of magnetic flux 48 may be mounted on an outer surface 50 of input member 18.

The source of magnetic flux 48 is preferably operable to provide from zero magnetic flux up to a first level of magnetic flux sufficient to activate magnetically reactive medium 28. The source of magnetic flux 48 is also preferably operable from zero magnetic flux up to at least a second level of magnetic flux sufficient to cause friction plate 30 to contact output member 22, as will be described in further detail below.

Figure 4:
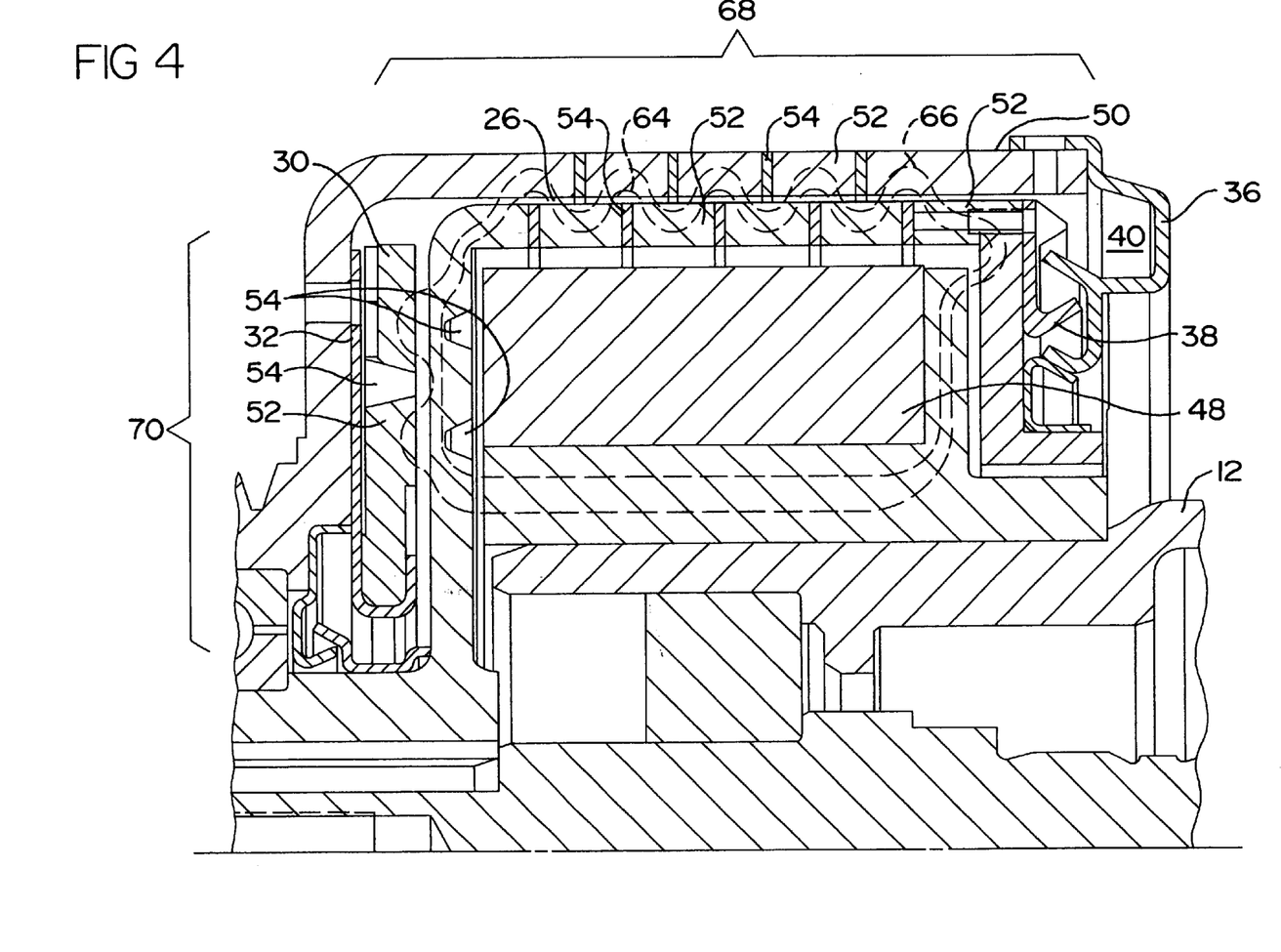
FIG. 4 is an enlarged cross-sectional view of the torque transfer device shown in FIG. 1 illustrating a first flux path traversing the first gap and a second flux path traversing the first gap and a second gap.

In a preferred embodiment, input member 18 and output member 22 are generally drum-shaped defined by a cylindrical portion extending from a base portion. The cylindrical portions of input member 18 and output member 22 are each provided with regions of high magnetic permeability 52 and regions of low magnetic permeability 54. As illustrated in FIG. 4, the regions of high and low magnetic permeability 52 and 54, respectively, are strategically positioned to form a flux path through which lines of magnetic flux, generally denoted by element number 56, travel. More specifically, regions of high magnetic permeability 52 are radially aligned in one member 18, 22 with regions of low magnetic permeability 54 in another member 18, 22 such that lines of magnetic flux 56 are forced to traverse first gap 26 substantially between the regions of low magnetic permeability 54.

Figure 3:
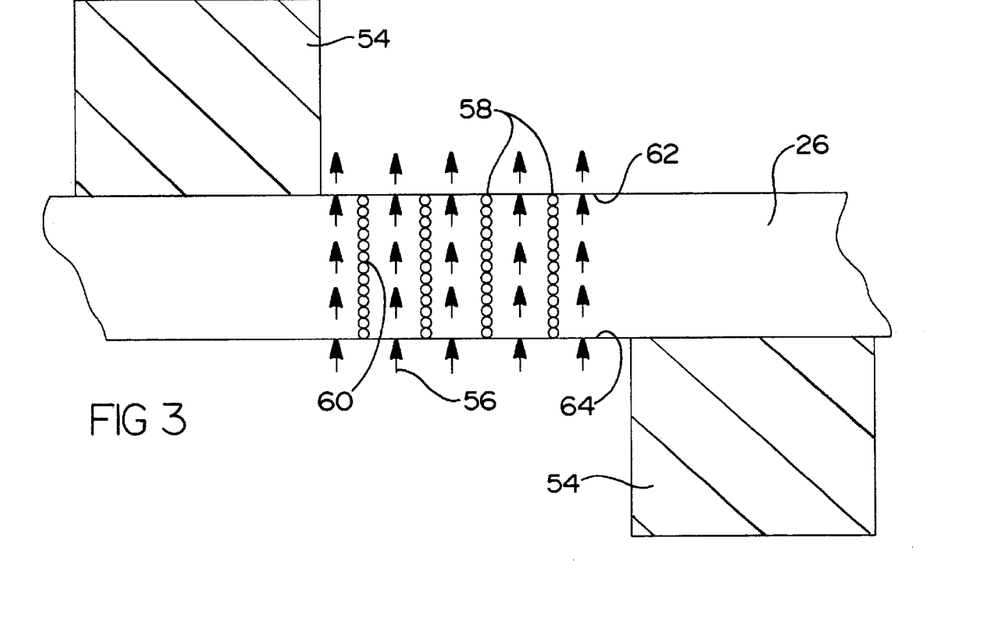
FIG. 3 is an enlarged cross-sectional view of the first gap during engagement of the torque transfer device showing lines of magnetic flux across the gap.

The traversing lines of magnetic flux 56 activate magnetically reactive medium 28. To illustrate, as illustrated in FIG. 3, magnetically reactive particles 58 in medium 28 change formation, in relation to the intensity of the magnetic field, by aligning with lines of magnetic flux 56 as flux 56 traverses first gap 26. Magnetically reactive particles 58 under the influence of a magnetic field will lock into chains 60 increasing the shear force and creating a mechanical friction against surfaces 62 and 64 of input member 18 and output member 22, respectively. The increased shear force and mechanical friction results in a corresponding transfer of torque between input member 18 and output member 22 that is precisely controlled in relation to the strength of the applied magnetic field.

In the embodiment of FIG. 1, the input and output members 18, 22 of torque transfer device 10 include multiple regions of high magnetic permeability 52 and low magnetic permeability 54. However, device 10 may be configured to include any number of alternating regions of high and low magnetic permeability 52, 54 with the most basic configuration required for operation being a single region of low magnetic permeability 54 in output member 22 and no regions of low magnetic permeability 54 in input member 18. The single region of low magnetic permeability 54 in output member 22 is provided to prevent lines of magnetic flux 56 from "short-circuiting" through output member 22.

As will be appreciated, the preferred embodiment illustrated in FIG. 1 can transfer a given amount of torque between input and output members 18, 22 with a weaker magnetic field due to the greater amount of activated medium 28. Thus, increasing the number of regions of high and low magnetic permeability 52, 54 permits the use of a smaller source of magnetic flux 48, providing inter alia a substantial weight savings.

Figure 5:
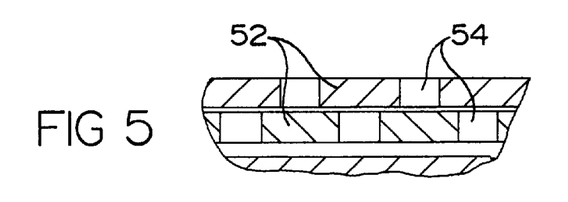
FIG. 5 is a cross-sectional view of an alternate embodiment of the regions of low magnetic permeability.

The regions of low magnetic permeability 54 are preferably formed by introducing non-magnetic materials, such as stainless steel, aluminum or a polymer, into input and output members 18, 22 or by removing material to form a cavity or groove. In the embodiment illustrated in FIG. 1, the regions of low magnetic permeability 54 comprise non-magnetic rings of metal such as stainless steel. Referring to FIG. 5, in an alternate embodiment, the regions of low magnetic permeability 54 may include circumferentially non-continuous cavities located in input and output members 18, 22.

Figure 6:
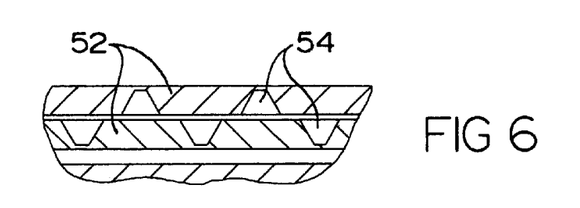
FIG. 6 is a cross-sectional view of another alternate embodiment of the regions of low magnetic permeability.
Figure 7:
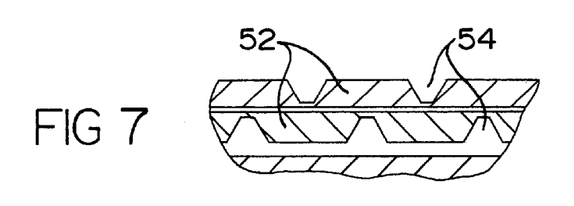
FIG. 7 is a cross-sectional view of yet another alternate embodiment of the regions of low magnetic permeability.
Figure 8:
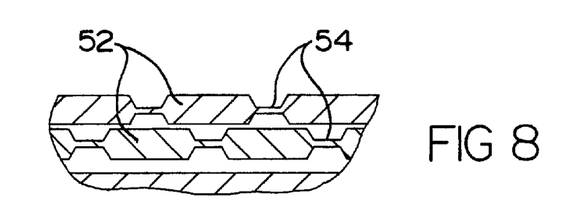
FIG. 8 is a cross-sectional view of still yet another alternate embodiment of the regions of low magnetic permeability.

In another alternate embodiment, the regions of low magnetic permeability 54 may include annular grooves located in input and output members 18, 22. Referring to FIGS. 6–8, the grooves may be positioned in the inner or outer surfaces of input and output members 18, 22 or, alternatively, in both the inner and outer surfaces of the input and output members 18, 22. However, positioning the grooves in surfaces 62 and 64 of input and output members 18, 22 respectively, has the advantage of removing inactivated medium 28 from first gap 26, which reduces the amount of "off-state" drag between input member 18 and output member 22.

Referring again to FIG. 4, a first magnetic flux path 64 and a second magnetic flux path 66 are shown in detail. The source of magnetic flux 48 creates the first magnetic flux path 64 by applying a magnetic field in the vicinity of output member 22. As the strength of the magnetic field is increased, the magnetic flux follows a path of least resistance and traverses first gap 26 into input member 18. The process of traversing first gap 26 substantially between the regions of low magnetic permeability 54 is repeated until the regions of low magnetic permeability 54 are exhausted.

As the magnetic field is increased from a first level to a second level, the regions of low magnetic permeability 54 in output member 22 located adjacent to friction plate 30 cause the adjacent regions of high magnetic permeability 52 to become saturated. Upon saturation, the magnetic flux traverses second gap 34 into friction plate 30, as illustrated by reference to flux path 66. The magnetic flux magnetically attracts friction plate 30 toward output member 22 against the force of resilient biasing member 32. Resilient biasing member 32 maintains second gap 34 until a sufficient magnetic field is generated to overcome the spring force of biasing member 32. Once the spring force of biasing member 32 is overcome, friction plate 30 frictionally contacts output member 22 to increase the amount of torque transferred between input member 18 and output member 22. Friction plate 30 may also include one or more regions of low magnetic permeability 54 to advantageously increase the number of times second flux path 66 weaves across second gap 34. Thus, it can be seen that torque transfer device 10 synergistically incorporates the functions of a particle clutch, depicted generally as elements 68, and an electromagnetic friction clutch, depicted generally as elements 70, to transfer torque between input member 18 and output member 22.

As described above, the source of magnetic flux 48 is controllable to provide a first level of magnetic flux that causes first magnetic flux path 64 to traverse first gap 26. The source of magnetic flux 48 is also controllable to provide a second level of magnetic flux that causes first magnetic flux path 64 to divert to second magnetic flux path 66. The magnetic field required to engage device 10 can be selectively controlled, for example, by controlling the amount of electrical current supplied to the source of magnetic flux 48. Thus, torque transferring device 10 is operable to transition between a disengaged state where neither particle clutch 68 nor electromagnetic friction clutch 70 are engaged, a partially engage state where particle clutch 68 is at least partially if not fully engaged, and a fully engage state where both particle clutch 68 and friction clutch 70 are engaged.

Figure 9:
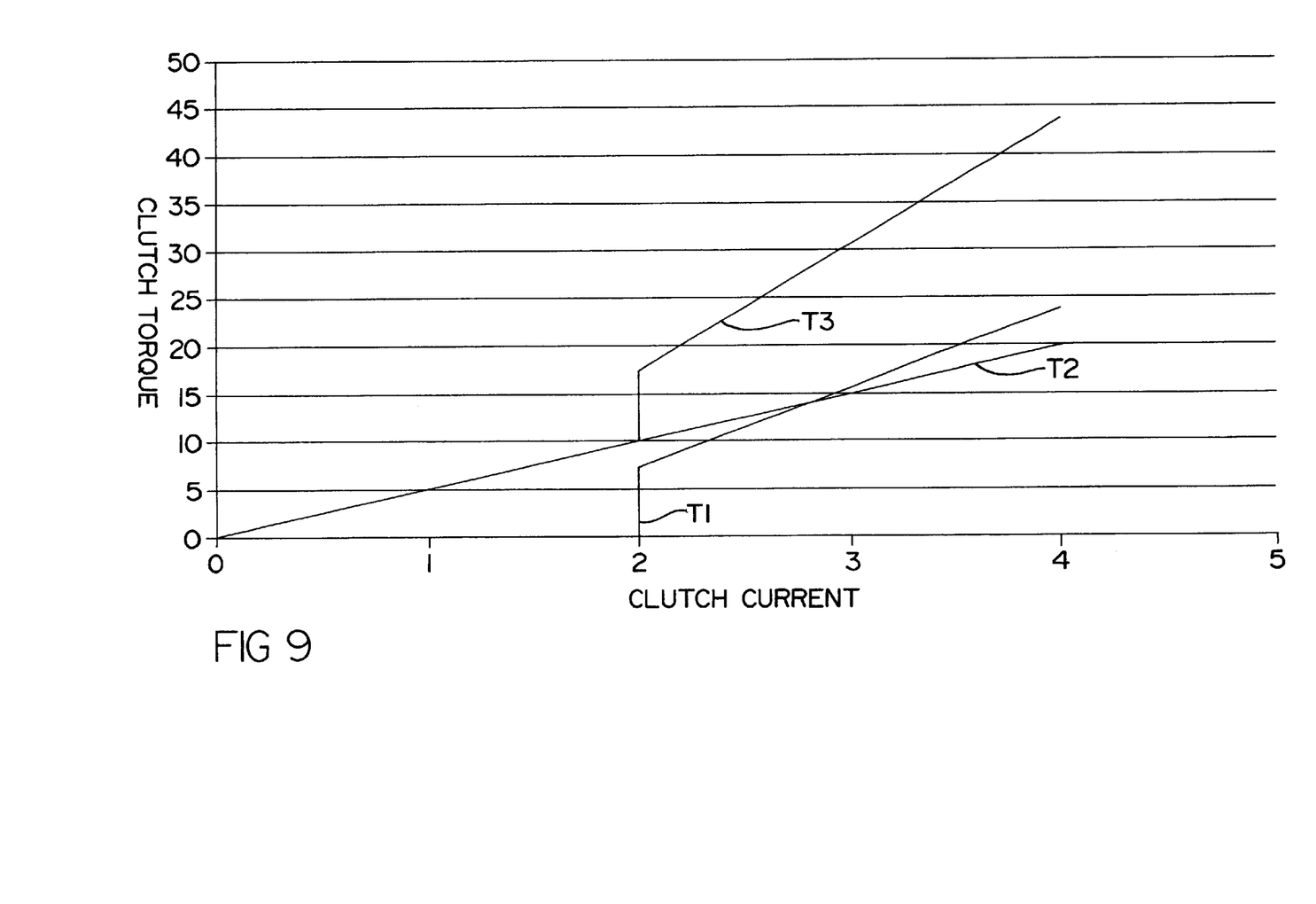
FIG. 9 is an exemplary clutch performance curve illustrating the effect of current versus torque for a particle clutch, an electromagnetic friction clutch and the combined particle clutch and electromagnetic friction clutch.

Referring now to FIG. 9, the torque transferring capacity of torque transfer device 10 is depicted graphically as a function of current supplied to the source of magnetic flux 48. The current versus torque profile of electromagnetic friction clutch 70 operating independently of particle clutch 68, as designated by T1, reveals the typical problem of "sudden impact" that occurs when electromagnetic friction clutch 70 is engaged. The current versus torque profile T2, on the other hand, reveals the gradual or "soft" engagement characteristics of a controlled engagement of particle clutch 68. Combining the engagement characteristics of particle clutch 68 and electromagnetic friction clutch 70 produces the current versus torque profile designated T3. Thus, device 10 can produce a gradual, smooth initial transfer of torque, yet still provide the relatively high levels of torque need to operate an accessory driven by torque transfer device 10.

Among other advantages, torque transfer device 10 substantially eliminates or reduces the "hard" or sudden engagement of conventional electromagnetic clutches. Another advantage is that torque transfer device 10 substantially eliminates or reduces the undesirable engagement sound that is characteristic of conventional electromagnetic clutches. Still another advantage is that particle clutch 68 and electromagnetic friction clutch 70 cooperate to allow for a gradual, controlled engagement of torque transfer device 10 without sacrificing the ability to transfer relatively high levels of torque. Still yet another advantage is that device 10 can be configured to reduce the size of the source of magnetic flux without sacrificing the amount of torque transferred between input member 18 and output member 22.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A torque transfer device, comprising:
   an input member for receiving torque from an external source, said input member having a region of high magnetic permeability;
   an output member disposed radially inward of said input member defining a first torque transferring region therebetween, said output member having regions of high magnetic permeability and at least one region of low magnetic permeability;

a second torque transferring region disposed between said input member and said output member; and a source of magnetic flux, whereby said source of magnetic flux is operable to provide a first level of magnetic flux to generate a torque by activation of said first torque transferring region and at least a second level of magnetic flux to generate a torque by activation of said first torque transferring region and said second torque transferring region.

2. The torque transfer device of claim 1, wherein said first torque transferring region is defined by a first gap containing a magnetically reactive medium.

3. The torque transfer device of claim 1, wherein said second torque transferring region includes an armature at least partially disposed between said input member and said output member forming a second gap between said armature and one of said input member and output member.

4. The torque transfer device of claim 3, wherein said armature is extendably coupled to the other of said input member and output member opposite said second gap.

5. The torque transfer device of claim 3, wherein said armature has regions of high magnetic permeability and low magnetic permeability.

6. The torque transfer device of claim 3, wherein said second level of magnetic flux corresponds to a saturation point where the magnetic flux traverses said second gap into said armature to activate said armature.

7. The torque transfer device of claim 1, wherein said source of magnetic flux includes an electromagnet.

8. The torque transfer device of claim 7, wherein said source of magnetic flux includes a permanent magnet.

9. The torque transfer device of claim 8, wherein said permanent magnet is offset by said electromagnet.

10. The torque transfer device of claim 1, wherein said input member further includes regions of low magnetic permeability.

11. The torque transfer device of claim 1, wherein said regions of low magnetic permeability comprise non-magnetic rings.

12. The torque transfer device of claim 1, wherein said regions of low magnetic permeability comprise grooves.

13. The torque transfer device of claim 1, wherein said regions of low magnetic permeability comprise a non-metallic material.

14. The torque transfer device of claim 1, wherein current provided to the source of magnet flux is controlled to provide a desired level of magnetic flux.

15. The torque transfer device of claim 14, wherein the current is linearly increased from a first level corresponding to said first level of magnetic flux to a second level corresponding to said second level of magnetic flux.

16. A torque transfer device, comprising:

a particle clutch comprising an input drum, an output drum and a magnetically reactive medium, said input drum configured to receive torque from an external source, said input drum having regions of high magnetic permeability and low magnetic permeability;

said output drum disposed within said input drum to define a first gap between said input drum and said output drum, said first gap containing said magnetically reactive medium, said output drum having regions of high magnetic permeability and low magnetic permeability, a friction clutch comprising a friction plate at least partially disposed between said output drum and said input drum and at least one biasing member coupled between said friction plate and one of said input drum and output drum for maintaining a second gap between said friction plate and the other of said input member and said output member when said friction plate is disengaged;

a flux path formed by said regions of low magnetic permeability aligned between said output drum and said input drum; and a source of magnetic flux, whereby said source of magnetic flux is operable to provide a first level of magnetic flux that traverse said first gap for engaging said particle clutch and a second level of magnetic flux that diverts said flux path to cause said magnetic flux to traverse said second gap to engage said friction clutch.

17. The torque transfer device of claim 16, wherein said friction plate has regions of high magnetic permeability and low magnetic permeability.

18. The torque transfer device of claim 16, wherein said second level of magnetic flux is greater in magnitude than said first level of magnetic flux.

19. The torque transfer device of claim 16, wherein said source of magnetic flux includes an electromagnet.

20. The torque transfer device of claim 16, wherein said second level of magnetic flux corresponds to a saturation point where the magnetic flux traverses said second gap into said friction plate to engage said friction plate.

21. The torque transfer device of claim 16, wherein the magnetic flux weaves between the regions of low magnetic permeability as the magnetic flux traverses the first and second gaps.

22. A torque transfer device, comprising:

a particle clutch comprising an input drum, an output drum and a magnetically reactive medium, said input drum for receiving torque from an external source, said input drum having a cylindrical portion extending from a base portion, said input drum having regions of high magnetic permeability and low magnetic permeability;

said output drum having a cylindrical portion extending from a base portion, said output drum disposed within said input drum to define a first gap along said cylindrical portions of said input drum and said output drum, said first gap containing said magnetically reactive medium, said output drum having regions of high magnetic permeability and low magnetic permeability;

a friction clutch comprising a friction plate disposed adjacent to one of said base portions of said output drum and said input drum to define a second gap therebetween and at least one biasing member coupled between said friction plate and the other of said base portion of said input drum and said base portion of said output drum for maintaining said second gap when said friction plate is disengaged; and a source of magnetic flux, whereby said source of magnetic flux is operable to transition the device among a non-engaged state where neither of said particle clutch nor said friction clutch are engaged, a partially engaged state where said particle clutch is at least partially engaged, and a fully engaged state where said particle clutch and said friction clutch are fully engaged.

23. The torque transfer device of claim 22, wherein said source of magnetic flux includes an electromagnet.

24. The torque transfer device of claim 23, wherein said source of magnetic flux includes a permanent magnet.

25. The torque transfer device of claim 22, wherein said friction plate has regions of high magnetic permeability and low magnetic permeability.

26. The torque transfer device of claim 22, wherein said regions of low magnetic permeability comprise non-magnetic rings.

27. The torque transfer device of claim 22, wherein said regions of low magnetic permeability comprise grooves.

28. The torque transfer device of claim 22, wherein said regions of low magnetic permeability comprise a non-metallic material.

29. The torque transfer device of claim 22, wherein current provided to the source of magnet flux is controlled to provide a desired level of magnetic flux.

30. The torque transfer device of claim 29, wherein the current is linearly increased from a first current level corresponding to a first level of magnetic flux to a second current level corresponding to a second level of magnetic flux.

31. The torque transfer device of claim 22, wherein said second level of flux corresponds to a saturation point where the magnetic flux traverses said second gap into said friction plate to activate said friction clutch.

32. The torque transfer device of claim 22, wherein the magnetic flux weaves between the regions of low magnetic permeability as the magnetic flux traverses the first gap.

* * * * *